Dec. 21, 1954    N. L. DICKINSON ET AL    2,697,655
MANUFACTURE OF A HYDROGEN-RICH GAS
Filed Dec. 31, 1947
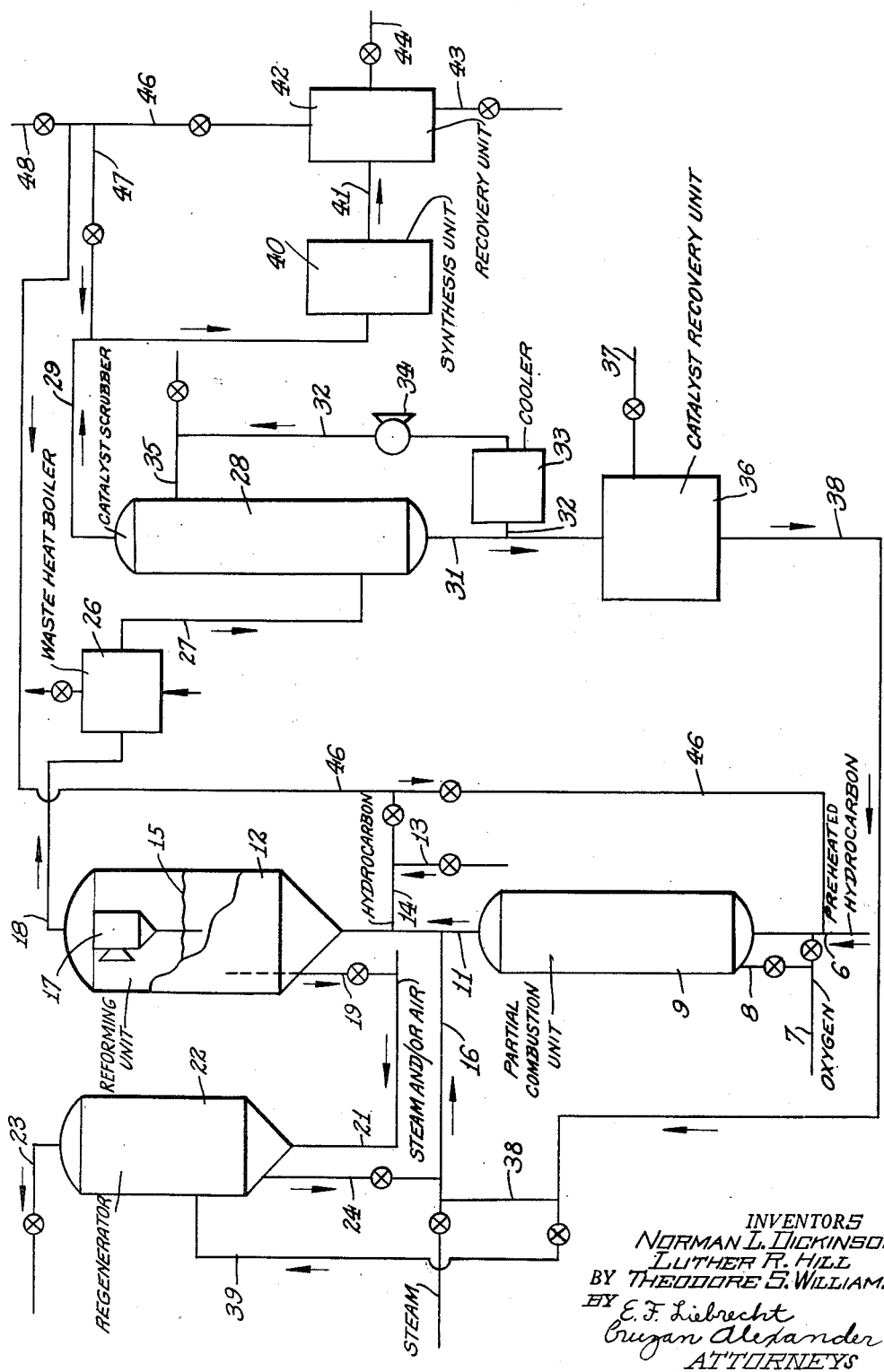
INVENTORS
NORMAN L. DICKINSON
LUTHER R. HILL
BY THEODORE S. WILLIAMS
E. F. Liebrecht
Cuyan Alexander
ATTORNEYS

2,697,655

MANUFACTURE OF A HYDROGEN-RICH GAS

Norman L. Dickinson, Basking Ridge, Luther R. Hill, Ridgewood, and Theodore S. Williams, Asbury Park, N. J., assignors to The M. W. Kellogg Company, Jersey City, N. J., a corporation of Delaware Application December 31, 1947, Serial No. 794,856

11 Claims. (Cl. 48—196)

This invention relates to the production of a gas rich in hydrogen, useful for the synthesis of organic compounds. In one particular aspect this invention relates to an integrated process involving the production of hydrogen and an oxide of carbon and the subsequent interaction of the hydrogen and oxide of carbon in the presence of a hydrogenation catalyst to produce hydrocarbons having more than one carbon atom per molecule and oxygenated organic compounds.

Hydrogen and a carbon oxide, such as carbon monoxide, have been made to react exothermically in the presence of a suitable catalyst under specific reaction conditions to form hydrocarbons and oxygenated organic compounds. In general, the synthesis of such organic compounds by the hydrogenation of a carbon oxide, such as carbon monoxide, is accomplished in the presence of a metal or a metal oxide chosen from group VIII of the periodic table as the catalyst at a pressure between about atmospheric and about 500 pounds per square inch gage and at temperatures between about 300 and about 750° F. The mol ratio of hydrogen to carbon monoxide in this synthesis process is between about 1:1 and about 3:1, preferably a mol ratio of about 2:1 for at such a ratio of hydrogen and carbon monoxide in the feed the optimum amount of normally liquid organic compounds is produced. The feed gas for the synthesis reaction should contain substantial proportions of both hydrogen and carbon oxides and preferably should contain less than about 15 to 30 volume per cent of gaseous components other than the above.

The object of this invention is to provide a method for the production of the synthesis gas feed comprising hydrogen and an oxide of carbon in relatively large proportions.

Another object of this invention is to provide a process for the synthesis of organic compounds from a normally gaseous hydrocarbon, such as methane.

It is another object of this invention to provide a process for the manufacture of a gas rich in hydrogen and carbon monoxide at relatively high pressures.

Still another object of this invention is to provide an integrated process for the conversion of a normally gaseous hydrocarbon into hydrogen and an oxide of carbon and the subsequent conversion of the oxide of carbon and hydrogen to hydrocarbons having more than one carbon atom per molecule and oxygenated organic compounds.

It is a further object of this invention to provide a more economical process than heretofore for the production of a synthesis feed gas having relatively large proportions of hydrogen and carbon monoxide.

Various other objects and advantages of the present invention will become apparent to those skilled in the art from the accompanying description and disclosure.

According to this invention, methane or other normally gaseous hydrocarbon, or mixture thereof, is reacted in a reaction zone with steam under endothermic conditions of reforming such that hydrogen and an oxide of carbon are produced. To supply the endothermic heat of reaction in the reforming zone, methane or other normally gaseous hydrocarbon or mixture thereof is reacted with oxygen under exothermic conditions of partial combustion in another reaction zone to produce hydrogen and carbon monoxide. The reaction effluent from the partial combustion zone at a relatively elevated temperature and of high heat content is passed to the reforming reaction zone and mixed directly with the reactants therein to supply substantially all of the endothermic heat of reaction and to modify the products of reaction from the partial combustion zone by interaction with the reactants and products of the reforming zone. As a result the reaction effluent from the reforming zone contains hydrogen and carbon monoxide in relatively large proportions and is suitable as a feed gas for the synthesis of hydrocarbons and oxygenated organic compounds in the presence of a suitable hydrogenation catalyst.

It is believed that this invention may be best understood and described by reference to the accompanying drawing which shows a diagrammatic arrangement of apparatus, in elevation and partly in cross-section, for the manufacture of a synthesis gas feed and the subsequent synthesis of organic compounds therefrom. The principal pieces of apparatus comprise a partial combustion unit 9, a reforming unit 12, a catalyst scrubber 28, a conventional synthesis unit 39 and a conventional product recovery unit 42.

In accordance with the illustration in the drawing, methane or a methane-containing gas from any suitable source, such as natural gas, after removal of hydrogen sulfide therefrom by conventional methods, is passed under pressure through conduit 6 to combustion unit 9. Although methane is referred to specifically as the feed, the use of other normally gaseous hydrocarbons, such as ethane and propane, is within the scope of this invention. Oxygen or an oxygen-containing gas is passed to combustion unit 9 through conduits 7 and/or 8. Conduit 7 is used when it is desired to admix the hydrocarbon and oxygen prior to introduction into the combustion unit 9 and conduit 8 is for use to introduce oxygen and the hydrocarbon separately, such as when mixing of the reactants is effected by means of a burner (not shown) in combustion unit 9. Methane may be preheated, if desired, prior to introduction into combustion unit 9. The preheating of methane is conveniently accomplished by indirect heat exchange with the effluent of reformer unit 12 or by a separate preheating furnace (not shown). The oxygen may also be preheated as it may frequently be economical to do so.

In combustion unit 9, methane is oxidized to hydrogen, carbon monoxide, carbon dioxide and water, according to the following typical equations.

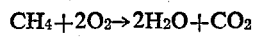

The temperature of combustion unit 9 is maintained between about 1700 and about 2600° F., preferably a temperature between about 1800 and about 1900° F. when using a catalyst, such as nickel, and a temperature between about 2350 and about 2500° F., when not using a catalyst. A pressure between about one atmosphere and about 800 pounds per square inch gage is suitable and appropriate for the partial combustion reaction being effected in combustion unit 9. The pressure will be slightly in excess of the pressure prevailing in reforming unit 12 in order to avoid compression between combustion unit 9 and reforming unit 12. The partial combustion reaction is preferably effected with a catalyst, such as a catalyst comprising nickel or nickel oxide supported on a heat resistant support, such as alundum or zirconium oxide. The catalyst is maintained in a stationary bed in the form of pellets, granules, porous tubes of ceramic material impregnated with the catalyst, etc. The reactions effected in unit 9 are exothermic requiring only preheating of the methane stream to effect the reaction. The mol ratio of oxygen to methane (or organic carbon) entering the reaction zone is maintained between about 0.5:1 to about 0.7:1. Since the temperature of reaction is a function of the ratio of oxygen to methane, a specific ratio within the above range is chosen to give the desired temperature at which in conjunction with the pressure chosen conversion of methane to hydrogen and carbon oxide is optimum and carbon formation is minimized.

Combustion unit 9 may comprise a pressure vessel in the form of a carbon steel shell capable of withstanding the pressure of operation and protected from excessive temperature by a cast lining of a suitable refractory material, such as zirconium oxide, including a burner fabricated of a heat resistant alloy and cooled by circulating steam or water through it.

Although substantially pure oxygen is preferred as the oxidizing agent for the methane combustion, air or other oxygen-containing gas may be used without departing from the scope of this invention. It is preferred that the oxygen-containing gas contain not more than ten per cent ingredients other than oxygen. The amount of inert ingredients other than oxygen present in the oxygen-containing gas will depend upon the amount of inert gases than can be tolerated in the subsequent synthesis of the organic compounds, such as in synthesis unit 39 and recovery unit 42. It is obvious that the more inert material present in the feed gas the more difficulty is the recovery and separation procedure in recovery unit 42, which unit will be discussed more fully hereinafter.

A reaction effluent comprising hydrogen and carbon monoxide in a mol ratio of less than about 2:1 and containing in addition carbon dioxide, steam and unreacted methane, is continuously removed from combustion unit 9 through conduit 11. The specific mol ratio of hydrogen to carbon monoxide in the product from combustion unit 9 is usually between about 1.7:1 and about 1.9:1 with no recycle and about 1.2:1 to about 1.8:1 when recycle gas containing carbon dioxide is recycled to conduit 6 through conduit 46.

The composition of a typical reaction effluent from partial combustion unit 9 is shown in Table I below. This composition is illustrative of that in which the feed contains substantially no carbon dioxide and will depend on such factors as the operating conditions of temperature and pressure, the ratio of methane to oxygen, catalyst, etc.

*Table I*

| | |
|---|---|
| $N_2$ mol percent | 1.8 |
| $H_2$ do | 59.6 |
| $CO$ do | 35.1 |
| $CO_2$ do | 2.8 |
| $CH_4$ do | 0.7 |
| Total (dry basis) do | 100.0 |
| $H_2:CO$ ratio | 1.7:1 |

The reaction effluent from combustion unit 9, which is at a relatively high temperature corresponding substantially to the conversion temperature in unit 9, is continuously passed through conduit 11 to reforming unit 12. Methane or other normally gaseous hydrocarbon or mixture thereof and steam, preferably preheated to about 1000° F., are introduced into reforming unit 12 through conduits 13 and 14, and 16, respectively. As shown, the steam and hydrocarbon are introduced into conduit 11 for admixture with the effluent from unit 9 prior to introduction into reforming unit 12. However, the introduction of methane and steam either separately or in admixture directly into reforming unit 12 is also within the scope of this invention. In some instances it is unnecessary to introduce steam from an external source into reforming unit 12, since sufficient steam will often be present in the effluent from combustion unit 9. The reaction between steam and methane is endothermic and this heat is supplied from the sensible heat content of the effluent gases from combustion unit 9 without aid of externally supplied heat by indirect heat exchange with unit 12. The temperature of reforming unit 12 is maintained in this manner between about 1200 and about 2000° F., which temperature is lower than that of combustion unit 9 but is sufficient for conversion of methane with steam to hydrogen and carbon monoxide. Preferably, the temperature is maintained between about 1250 and about 1600° F. in reforming unit 12 for relatively low pressures, such as atmospheric pressure, and between about 1600 and about 1900° F. for pressures above about 250 or 300 pounds per square inch gage. The ratio of steam, including steam from combustion unit 9 as well as externally added steam, to methane introduced into reforming unit 12 is about two mols of steam per mol of methane, although higher or lower ratios may be used. Externally added carbon dioxide can be employed to replace a portion of the added steam, such as by recycling gases from recovery unit 42 through conduit 46 to be discussed more fully hereinafter. For example, one mol of steam and one mol of carbon dioxide may be employed per mol of methane in effecting the reaction in reforming unit 12. Typical equations for the reaction of methane with steam and carbon dioxide are shown below:

$$CH_4 + H_2O \rightarrow CO + 3H_2$$
$$CH_4 + CO_2 \rightarrow 2CO + 2H_2$$

The interaction of methane with steam or methane with steam and carbon dioxide is preferably effected in the presence of a suitable catalyst in reforming unit 12. Suitable reforming catalysts comprise nickel or nickel oxide supported on alumina or other supporting material, such as for example, a catalyst containing in parts by weight 1 NiO, 0.2 $Cr_2O_3$, 1.68 $SiO_2$, 0.9 MgO. Other reforming catalysts comprise molybdenum, cobalt and chromium and their oxides and sulfides. With such catalysts relatively low temperatures are used.

A gaseous effluent comprising hydrogen and carbon monoxide in a mol ratio usually greater than about 2:1 is continuously removed from reforming unit 12 through conduit 18. Such a gaseous effluent in conduit 18 has approximately a composition as shown in the example illustrated hereinafter when natural gas is the source of methane. It will be understood that the composition of the effluent will depend upon the reforming operating conditions, the catalysts, the space velocity, etc.

In some instances the use of externally applied heat in reforming unit 12, such as by indirect heat transfer through tubes in a gas fired furnace, to supplement the heat supplied from the effluent of partial combustion unit 9 may be practiced without departing from the scope of this invention. However, this is not the preferred method of operation and is used only where relatively low pressures are desirable and for the principal purpose of obtaining a desired modification of the products of reaction from the combustion zone by passing them through the reforming zone, as it is the primary purpose of the present invention to use higher pressures than mechanical limitations have permitted heretofore.

By passage of the products of combustion unit 9 through reforming unit 12, a final effluent gas of a relatively high ratio of hydrogen to carbon monoxide is obtained as a result of the water gas shift and it may be desirable to by-pass (not shown) a portion of the combustion unit effluent around reforming unit 12. The by-passed combustion unit effluent is combined with the effluent from reforming unit 12 to produce a gas of the desired hydrogen to carbon monoxide ratio, the ratio being less than that obtained without such by-pass modification.

According to the preferred modification shown in the drawing, reforming unit 12 comprises a fluid-bed reaction chamber in which catalyst is maintained in a finely divided form in a fluidized pseudo-liquid condition in the chamber. Effluent gases from conduit 11 are passed upward through a mass of finely-divided catalyst, such as finely-divided nickel, in a cylindrical chamber of appropriate cross-section such that the finely-divided particles are suspended and form a dense pseudo-liquid phase in the lower portion of reforming unit 12. This dense phase of catalyst is characterized by an interface 15 between itself and a more dilute phase in the reaction chamber. The dense phase has many of the characteristics of a liquid and the finely-divided particles possess a high degree of turbulence and circulation within the dense phase itself. The density or concentration of catalyst in the dilute phase is of an entirely different order of magnitude than that of the dense phase and corresponds to a separation zone in which finely-divided particles are entrained in the gaseous mixture pass upward through the dense phase into the dilute phase, settle out, and fall back into the dense phase. The use of finely-divided catalyst in a suspended condition enables the maintenance of substantially uniform temperatures throughout the reaction chamber 12 and also by virtue of its construction enables the use of substantially higher pressures and temperatures than could be used in a conventional reforming furnace in which heat must be supplied indirectly. Thus, using a fluid-bed reforming unit and supplying the endothermic heat of reaction from the effluent from combustion unit 9, pressures substantially above those heretofore thought possible may be used, such as pressures above about 50 or 150 pounds per square inch gage and as high as 600 pounds per square inch gage.

When operating with a finely-divided catalyst in a fluidized condition, catalyst entrained in a gaseous mixture in the dilute phase is separated therefrom prior to removal from unit 12 by means of a mechanical separator, such as a cyclone separator 17. Other means for separating entrained finely-divided catalyst, such as Cottrell precipitators, settling zones, may be used without departing from the scope of this invention.

In the reforming operation, carbonaceous deposits are formed under some operating conditions and deposit upon the catalyst particles which deposits decrease catalyst activity and density. Soot from combustion unit 9 may also deposit on the catalyst in reforming unit 12. As a result it is often desirable to remove at least a portion of the catalyst, either intermittently or continuously, from unit 12 and to remove the carbonaceous deposits or otherwise revivify the catalyst. To accomplish the revivification of the catalyst or removal of the carbonaceous deposits therefrom, catalyst is withdrawn from reforming unit 12 by means of a standpipe 19. Catalyst is passed from standpipe 19 into a conduit 21 through which steam and/or air is flowing. By virtue of the flowing steam and/or air, catalyst is entrained in the gaseous mixture in conduit 21 and is passed to a regenerator 22. In regenerator 22 the finely-divided catalyst is maintained in a fluidized condition substantially the same as that described heretofore. Carbonaceous deposits are stripped and/or oxidized with the steam and/or air in regenerator 22. Flue gases containing carbon dioxide are removed from regenerator 22 through conduit 23. As in the case of reforming unit 12 a cyclone separator or like means (not shown) may be provided in the upper portion of regenerator 22 for removal of entrained finely divided catalyst from the dilute phase. Substantially completely decarbonized and revivified catalyst is removed from regenerator 22 by means of standpipe 24. The regenerated catalyst is introduced into the steam line 16 for reintroduction into reforming unit 12 through conduits 16 and 11.

When the catalyst is regenerated, a temperature between about 1000 and about 1800° F. is employed and a pressure used corresponding substantially to the pressure prevailing in reforming unit 12. When the catalyst is regenerated with steam by the water gas reaction, air is admixed with the steam to burn sufficient carbon on the catalyst to raise the temperature to the desired value. In all cases, the temperature is maintained below the maximum safe regeneration temperature for the particular catalyst regenerated.

Regenerator 22 may be eliminated and the catalyst passed directly through standpipe 19 to steam conduit 16. Steam or other gas, such as oxygen, may be injected into standpipe 19 by means not shown in order to aerate the catalyst and to strip and/or oxidize carbonaceous deposits from the catalyst. Fresh catalyst is introduced into the system through conduit 16.

Reforming unit 12 may be operated as a fixed catalyst bed reactor in which the catalyst is in the form of pellets or granules and is positioned in a stationary bed in reforming unit 12. Two or more reforming units may be used in parallel when fixed bed operations are employed in order that the catalyst may be regenerated in one unit while the other unit is on process flow.

With the use of temperatures above about 2000° F. in reforming unit 12, the use of a catalyst is obviated. It is, therefore, within the scope of this invention to perform the reforming operation in unit 12 without a catalyst when a temperature above 2000° F. is maintained therein.

A reaction effluent comprising entrained catalyst, carbon monoxide, hydrogen, unreacted methane, water and small amounts of carbon dioxide is passed from reforming unit 12 through conduit 18, waste heat boiler or heat exchanger 26, conduit 27 to catalyst scrubber 28. A substantial proportion of the heat content of the reaction effluent in conduit 18 is recovered in waste heat boiler 26 in which steam is produced. The steam may be used as a reactant in the process or as a source of power for pumps, etc. Unit 26 may comprise a heat exchanger for preheating the hydrocarbon streams in conduit 6 or conduit 14.

In catalyst scrubber 28 an upward flowing gaseous effluent is contacted and sprayed with a down-flowing liquid, such as water, introduced through conduit 35. Baffles and like means (not shown) are positioned in catalyst scrubber 28 to insure intimate contact between the gaseous effluent and the liquid scrubbing medium. A liquid scrubbing medium containing entrained catalyst particles which were not removed by cyclone separator 17 is withdrawn from catalyst scrubber 28 through outlet conduit 31. A portion of this slurry is recycled through conduit 32 and cooler 33 by means of pump 34 to the upper portion of catalyst scrubber 28. The remainder of the slurry containing the scrubbing medium and entrained catalyst is passed to a catalyst recovery unit which may conveniently comprise a conventional settling zone or filter familiar to those skilled in the art for separating the finely-divided catalyst particles from the liquid scrubbing medium. A scrubbing medium, such as water, substantially free from entrained catalyst is removed from catalyst recovery unit 36 through conduit 37 and is recycled to catalyst scrubber 28 through conduit 35. Recovered catalyst from catalyst recovery unit 36 is removed therefrom from outlet conduit 38 and is recycled either as a slurry by means of a suitable pump, or in a dry state by means of a standpipe, a Fuller Kenyon pump, or a pressured hopper (not shown) to conduit 16 or to regenerator 22 through conduit 39. From conduit 16 the recovered catalyst from unit 36 is returned to reforming unit 12. From regenerator 22 the recovered catalyst from unit 36 is returned to reforming unit 12 through standpipe 24, conduits 16 and 11.

The reaction effluent is cooled to a temperature below about 200° F. in catalyst scrubber 28 by contact with the liquid scrubbing medium and at this temperature substantially all of the unconverted steam is condensed. Water is removed from the system with the scrubbing medium through conduit 37. Preferably, the reaction effluent is cooled to a temperature of about 100° F. A reaction effluent comprising hydrogen and carbon monoxide and substantially free from entrained catalyst is continuously passed through conduit 29 to synthesis unit 40. If reforming unit 12 is operated at a lower pressure than synthesis unit 20, a compressor (not shown) is supplied in conduit 29, otherwise no compressor is necessary.

Synthesis unit 40 comprises any of several types of conventional reaction chambers, such as fixed bed or fluid bed reaction chambers, and the necessary auxiliary equipment known to those skilled in the art. Synthesis unit 40 may comprise several reactors in series or in parallel. The reaction effluent or synthesis gas fed in conduit 29 has a mol ratio of hydrogen to carbon monoxide between about 1:1 and about 3:1 and in accordance with the preferred operating conditions of this invention the mol ratio is about 2:1. The synthesis gas feed is passed through synthesis unit 40 in contact with a suitable catalyst, such as iron or other metal or metal oxide of group VIII of the periodic table, under conditions of reaction such that hydrocarbons having more than one carbon atom per molecule and oxygeneated organic compounds are produced as products of the process. The temperature of reaction in synthesis unit 40 is generally between about 300 and about 750° F. and a pressure is maintained between about atmospheric and about 500 pounds per square inch gage. When employing an iron or an iron oxide catalyst, a temperature between about 450 and about 650° F. is appropriate. When employing a cobalt catalyst a temperature below 450° F. is employed. Sufficient contact time of reactants and reaction products with the catalyst material is afforded in synthesis unit 40 to form the desired products of the process. Usually a contact of gases with catalyst of about 2 to 20 seconds is appropriate.

When a fluidized system is used in synthesis unit 40 and when the reforming catalyst of unit 12 is the same as or is not detrimental to the synthesis reaction in synthesis unit 40, scrubber 28 may be omitted and entrained catalyst passed directly to synthesis unit 40 without departing from the scope of this invention. When synthesis unit 40 is operated as a fluidized system in which the finely-divided catalyst is suspended in the gaseous reaction mixture, means must be provided as in the case of unit 12 for removal of entrained catalyst from the reaction effluent, such as a cyclone separator.

Entrained catalyst removed from the effluent of synthesis unit 40 is returned either directly to synthesis unit 40 or to regenerator 22 or reformer unit 12. A portion of the fluidized catalyst in synthesis unit 40 may be removed directly from the dense phase of synthesis unit 40 and passed either to regenerator 22 or reforming unit 12.

In this manner a single regenerator may be used for revivifying and regenerating both the synthesis unit catalyst and the reformer unit catalyst. In some instances, the transfer of the synthesis catalyst to reforming unit 12 will in itself regenerate the catalyst, such as by stripping and by the water gas reaction, sufficient for return to synthesis unit 40.

A synthesis reaction effluent comprising hydrocarbons, oxygenated organic compounds, steam, carbon dioxide, and unreacted reactants including some methane, is removed from synthesis unit 40 through conduit 41 and is passed to a recovery unit 42. Recovery unit 42 comprises conventional equipment for cooling and condensing the synthesis reaction effluent and suitable fractionation and/or extraction equipment for separation and recovery of the products of the process. The synthesis reaction effluent is usually cooled to a temperature below about 300° F., preferably below 100° F., in recovery unit 42. The normally gaseous or unrecovered uncondensed components of the synthesis reaction effluent are removed from recovery unit 42 through conduit 46 and may be recycled in whole or in part directly to synthesis unit 40 through conduit 47, or may be passed in whole or in part through conduit 46 to conduit 14 or to conduit 6 as previously discussed. Water containing dissolved oxygenated organic compounds is removed from recovery unit 42 through conduit 44. These oxygenated organic compounds may be recovered from the water by various conventional means known to those skilled in the art as products of the process. Hydrocarbons are removed from recovery unit 42 through conduit 43 and may be processed further for ultimate use as a motor fuel, solvents, and chemical reactants.

When iron is used as a synthesis catalyst a considerable amount of carbon dioxide is present in the reaction effluent in conduit 41, usually between about 20 and about 50 per cent of carbon dioxide. In such a case, it is economically desirable to recycle the carbon dioxide-containing gases from recovery unit 42 through conduit 46 to reforming unit 12. Furthermore, the normally gaseous components in conduit 46 include methane which may be a secondary source of methane for both partial combustion unit 9 and reforming unit 12. When the carbon dioxide content of the recycle gases in conduit 46 is low, such as below about 20 per cent, it is preferred to recycle directly to combustion unit 9 rather than reforming unit 12.

Typical composition of recycle gases in conduit 46 is illustrated in Table II below when using an iron synthesis catalyst.

Table II

| | Mol percent |
|---|---|
| $N_2$ | 2.4 |
| $H_2$ | 47.4 |
| $CO$ | 6.3 |
| $CO_2$ | 32.3 |
| $CH_4$ | 8.5 |
| $C_2+$ | 3.1 |

In order to prevent the build-up of nitrogen in the system, a portion of the gaseous effluent in conduit 46 is vented to the atmosphere or is passed to a carbon dioxide recovery unit. Carbon dioxide recovery unit is not shown but comprises a conventional scrubber unit using for example, an ethanolamine as a solvent. The carbon dioxide is stripped from the solvent and recycled through conduit 46.

The process of the drawing is particularly adaptable to fluid-bed operations for both reforming unit 12 and synthesis unit 40 and to the use of relatively high pressures, such as pressures between about 150 and about 600 pounds per square inch gage. As previously indicated, entrained catalyst from reforming unit 12 may often be passed directly to synthesis unit 40, such as when using nickel as a reforming and synthesis catalyst, without detrimental effect. Such factor eliminates the necessity of complicated and expensive recovery equipment to remove entrained catalyst from the reforming unit effluent.

Since reforming unit depends for its source of heat upon the heat content of the partial combustion unit effluent, the equipment may be constructed to withstand considerably higher pressures than is possible with a conventional reforming furnace. Therefore, the entire system may be operated economically at relatively high pressures and at those pressures most suited for the synthesis of organic compounds from hydrogen and carbon monoxide. In this manner of operation in which substantially the same pressures, except for frictional losses, are used throughout the process, the only compression necessary is on conduit 6 and conduit 14, which eliminates the compression of hot gases with its obvious disadvantages.

Certain valves, coolers, heaters, distillation columns, pumps, cyclone separators, standpipes, etc. have been omitted from the drawings as a matter of convenience and their use and location will become obvious to those skilled in the art. The lengths of the conduits in the drawings are not proportional to the distance traveled but are merely diagrammatical. The examples of composition of gases and theory in connection with this invention are offered as illustration and should not be construed to be unnecessarily limiting to the invention. The use of the product gas from reforming unit 12 as feed to a synthesis process is merely an example of the preferred embodiment of this invention.

The following example of the operation of the process of producing hydrogen and carbon monoxide from methane is offered as a better understanding of the invention.

EXAMPLE

According to this invention 16,000 pounds of methane and 20,810 pounds of oxygen are introduced into a combustion chamber at a pressure about 300 pounds per square inch gage and are reacted to produce hydrogen and carbon monoxide. The methane is preheated to about 1000° F. and the oxygen is preheated to about 700° F. prior to introduction into the combustion zone. An effluent having the following composition is withdrawn at a temperature of about 2600° F. from the combustion chamber.

Table III

| | Pounds | Wt. Percent |
|---|---|---|
| $H_2$ | 3,490 | 9.5 |
| $CO$ | 26,700 | 72.5 |
| $CO_2$ | 2,070 | 5.7 |
| $H_2O$ | 4,550 | 12.3 |
| | | 100.0 |

$H_2/CO$ mol ratio=1.8.

This reaction effluent is passed to a reforming chamber and mixed therein with 4,000 pounds of additional methane and 9,000 pounds of additional steam. The additional methane and steam introduced into the reforming chamber are preheated to about 1000° F. No external heat is supplied to the reforming reaction except that obtained from the sensible heat of the combustion chamber effluent. In the reforming chamber methane, steam and carbon dioxide interact to produce hydrogen and carbon monoxide. The composition of the combined effluent removed from the reforming chamber is approximately as shown below in Table IV.

Table IV

| | Pounds | Wt. Percent |
|---|---|---|
| $CH_4$ | 1,600 | 3.4 |
| $H_2$ | 4,570 | 9.3 |
| $CO$ | 28,400 | 56.8 |
| $CO_2$ | 5,990 | 12.0 |
| $H_2O$ | 9,250 | 18.5 |
| | | 100.0 |

$H_2/CO$ mol ratio=2.25.

The temperature of the effluent from the reforming chamber is about 1800° F. The reaction effluent is heat exchanged with the various feed streams to supply at least a portion of the preheat. After heat exchange the effluent is at a temperature of about 1000° F. and is cooled further to about 600° F. or lower. The effluent containing hydrogen and carbon monoxide, after condensation of steam, is passed to a conventional synthesis reaction zone to produce organic compounds as products of the process.

We claim:
1. A process for the manufacture of a gas rich in hydrogen and carbon monoxide which comprises in a first reac- tion zone partially combusting methane with oxygen under exothermic conditions such that hydrogen and carbon monoxide are produced at a temperature between about 1700 and about 2600° F., removing from said first reaction zone an effluent at an elevated temperature, passing said effluent from said first reaction zone upward through a mass of finely-divided catalyst in a second reaction zone at a velocity sufficient to suspend said mass of catalyst therein, introducing steam and additional methane into said mass of finely-divided catalyst in said second reaction zone, reacting steam with methane in said second reaction zone under endothermic conditions of reforming at a temperature between about 1200 and about 2000° F. to produce hydrogen and carbon monoxide, maintaining said second reaction zone under substantially isothermal conditions with the endothermic heat of reaction being supplied principally from the sensible heat of the effluent from said first reaction zone, removing finely-divided catalyst from said second reaction zone and passing same to a third reaction zone, passing an oxidizing gas upwardly through said finely-divided catalyst in said third reaction zone at a velocity sufficient to suspend said catalyst in said third reaction zone, regenerating catalyst in said third reaction zone, removing regenerated catalyst from said third reaction zone and returning same to said second reaction zone, removing from said second reaction zone an effluent containing finely-divided entrained catalyst, scrubbing said effluent from said second reaction zone with a liquid scrubbing medium under conditions such that the effluent is cooled and finely-divided entrained catalyst is removed therefrom by the scrubbing medium, separating recovered catalyst from said scrubbing medium and returning same to said third reaction zone, recovering scrubbed effluent containing hydrogen and carbon monoxide as a product of the process, and maintaining said first and said second reaction zones at a substantially elevated pressure between about 150 and about 600 pounds per square inch gage.

2. A method of producing hydrocarbon synthesis gas which comprises partially oxidizing a low-boiling hydrocarbon at a temperature of at least about 2350° F. to form a gaseous mixture comprising hydrogen and carbon monoxide as the principal reaction products, admixing with said mixture, at a temperature of at least about 2350° F., steam and carbon dioxide-containing effluent products from a synthesis reaction for the production of hydrocarbons and oxygenated organic compounds from carbon monoxide and hydrogen, and contacting the thus-formed mixture with a reforming catalyst at a temperature of at least about 1250° F. whereby steam and organic compounds of said effluent products are converted to additional hydrogen and carbon monoxide.

3. A process of producing synthesis gas, which process is characterized in that the molar ratio of hydrogen to carbon monoxide in the synthesis gas produced by said process can be varied readily from time to time, said synthesis gas consisting essentially of the products of reaction of natural gas, oxygen and water, substantially free of carbon and comprising hydrogen and carbon monoxide in a predetermined molar ratio, said process comprising reacting natural gas and oxygen in the absence of other reactants at an advanced conversion temperature of about 1700° F. to about 2600° F. and a superatmospheric pressure to produce raw synthesis gas comprising hydrogen, carbon monoxide, carbon dioxide and steam, said hydrogen and carbon monoxide being present in said raw synthesis gas in a molar ratio different from said predetermined molar ratio of hydrogen to carbon monoxide, permitting said raw synthesis gas to come to substantial thermodynamic equilibrium at said advanced conversion temperature, adding to said raw synthesis gas at said advanced conversion temperature and said superatmospheric pressure natural gas and at least one of steam and carbon dioxide at a temperature below said advanced conversion temperature in amounts and proportions such as yield when combined with said raw synthesis gas a mixture having the ratio of hydrogen to carbon desired in the final synthesis gas and different from the hydrogen to carbon ratio in the raw synthesis gas, reacting said added natural gas and at least one of steam and carbon dioxide with the raw synthesis gas to cool the resulting mixture to a re-equilibration temperature within the range of about 1600° F. to about 2100° F. and to produce a final synthesis gas having the predetermined molar ratio of hydrogen to carbon monoxide, and rapidly cooling said final synthesis gas from said re-equilibration temperature to a non-reactive temperature.

4. The process of claim 3 in which said substantial thermodynamic equilibrium of said raw synthesis gas is evidenced by a substantially complete conversion of said natural gas feed and a mol ratio of hydrogen to carbon monoxide of less than 2:1 in the raw synthesis gas.

5. The process of claim 3 in which natural gas and steam only are admixed with said raw synthesis gas.

6. The process of claim 3 in which said final synthesis gas is cooled to a temperature not higher than 1000° F. by indirect heat exchange with a liquid coolant.

7. The process of claim 3 in which said added natural gas and at least one of steam and carbon dioxide are reacted with the raw synthesis gas at the aforesaid equilibrium temperature in the presence of a fluidized bed of reforming catalyst.

8. A process for producing synthesis gas, which process is characterized in that the molar ratio of hydrogen to carbon monoxide in the synthesis gas produced by said process can be varied readily from time to time, said synthesis gas consisting essentially of the products of reaction of a low-boiling hydrocarbon, oxygen and water, substantially free of carbon and comprising hydrogen and carbon monoxide in a predetermined molar ratio, said process comprising reacting a low-boiling hydrocarbon and oxygen in the absence of other reactants at an advanced conversion temperature of about 1700° F. to about 2600° F. and a superatmospheric pressure to produce raw synthesis gas comprising hydrogen, carbon monoxide, carbon dioxide and steam, said hydrogen and carbon monoxide being present in said raw synthesis gas in a molar ratio different from said predetermined molar ratio of hydrogen to carbon monoxide, adding to said raw synthesis gas at said advanced conversion temperature and said superatmospheric pressure a low-boiling hydrocarbon and at least one of steam and carbon dioxide at a temperature below said advanced conversion temperature in amounts and proportions such as yield when combined with said raw synthesis gas a mixture having the ratio of hydrogen to carbon desired in the final synthesis gas and different from the hydrogen to carbon ratio in the raw synthesis gas, reacting said added low-boiling hydrocarbon and at least one of steam and carbon dioxide with the raw synthesis gas to cool the resulting mixture to a lower reactive temperature within the range of about 1200° F. to about 2100° F. and to produce a final synthesis gas having the predetermined molar ratio of hydrogen to carbon monoxide, and rapidly cooling said final synthesis gas from said lower reactive temperature to a non-reactive temperature.

9. A method for producing hydrocarbon synthesis gas which comprises partially oxidizing a low-boiling hydrocarbon at a temperature of at least about 1700° F. to form a gaseous mixture comprising hydrogen and carbon monoxide as the principal reaction products, admixing with said mixture, at a temperature of at least about 1700° F., steam and carbon dioxide-containing effluent products from a synthesis reaction for the production of hydrocarbons and oxygenated organic compounds from carbon monoxide and hydrogen, and contacting the thus-formed mixture with a reforming catalyst at a temperature of at least about 1250° F. whereby steam and organic compounds of said effluent products are converted to additional hydrogen and carbon monoxide.

10. A method for producing hydrocarbon synthesis gas which comprises partially oxidizing a low-boiling hydrocarbon at a temperature of at least about 2350° F. to form a gaseous mixture comprising hydrogen and carbon monoxide as the principal reaction products, admixing with said mixture, at a temperature of at least 2350° F., steam and carbon dioxide-containing effluent products from a synthesis reaction for the production of hydrocarbons and oxygenated organic compounds from carbon monoxide and hydrogen, and passing the thus-formed mixture upwardly through a fluidized bed of reforming catalyst at a temperature of at least 1250° F. whereby steam and organic compounds of said effluent products are converted to additional hydrogen and carbon monoxide.

11. A method for producing hydrocarbons of synthesis gas which comprises partially oxidizing a low-boiling hydrocarbon at a temperature of at least 2350° F. to form a gaseous mixture comprising hydrogen and carbon monoxide as the principal reaction products, admixing with said mixture, at a temperature of at least 2350° F., steam and carbon dioxide-containing effluent products from a synthesis reaction for the production of hydrocarbons and oxygenated organic compounds from carbon monoxide and hydrogen, contacting the thus-formed mixture with a reforming catalyst at a temperature of at least 1250° F. whereby steam and organic compounds of said effluent products are converted to additional hydrogen and carbon monoxide and preheating said low-boiling hydrocarbon feed by heat exchange with the effluent from the reforming step.

References Cited in the file of this patent

UNITED STATES PATENTS

| Number | Name | Date |
|---|---|---|
| 1,957,743 | Wietzel et al. | May 8, 1934 |
| 2,347,682 | Gunness | May 2, 1944 |
| 2,425,754 | Murphree et al. | Aug. 19, 1947 |
| 2,455,419 | Johnson | Dec. 7, 1948 |
| 2,471,104 | Gohr | May 24, 1949 |
| 2,486,879 | Rees et al. | Nov. 1, 1949 |
| 2,493,454 | Hagy | Jan. 3, 1950 |
| 2,532,514 | Phinney | Dec. 5, 1950 |